United States Patent
Loof et al.

(10) Patent No.: US 12,472,699 B2
(45) Date of Patent: Nov. 18, 2025

(54) INJECTION BONDING OF COMPOSITE VANE INTO POCKET

(71) Applicant: GKN Aerospace Sweden AB, Trollhättan (SE)

(72) Inventors: Johan Loof, Trollhättan (SE); Andrew Frampton, Trollhättan (SE); Jocke Pettersson, Halmstad (SE)

(73) Assignee: GKN Aerospace Sweden AB, Trollhättan (SE)

( * ) Notice: Subject to any disclaimer, the term of this patent is extended or adjusted under 35 U.S.C. 154(b) by 422 days.

(21) Appl. No.: 17/624,941

(22) PCT Filed: Jul. 14, 2020

(86) PCT No.: PCT/EP2020/069852
§ 371 (c)(1),
(2) Date: Jan. 5, 2022

(87) PCT Pub. No.: WO2021/009157
PCT Pub. Date: Jan. 21, 2021

(65) Prior Publication Data
US 2022/0288867 A1    Sep. 15, 2022

(30) Foreign Application Priority Data

Jul. 16, 2019 (GB) ..................... 1910198

(51) Int. Cl.
*B29C 65/54* (2006.01)
*B29C 65/00* (2006.01)
(Continued)

(52) U.S. Cl.
CPC .......... *B29C 65/542* (2013.01); *B29C 66/342* (2013.01); *B29C 66/7212* (2013.01); *B29C 66/7428* (2013.01); *B29C 66/9241* (2013.01); *B29K 2063/00* (2013.01); *B29L 2031/3076* (2013.01); *F01D 5/30* (2013.01); *F05D 2230/23* (2013.01)

(58) Field of Classification Search
CPC .. B29C 65/542; B29C 66/342; B29C 66/9241
See application file for complete search history.

(56) References Cited

U.S. PATENT DOCUMENTS 4,201,742 A * 5/1980 Hendry .................. B29C 44/428
264/DIG. 83
4,996,016 A 2/1991 Walls et al.
(Continued)

FOREIGN PATENT DOCUMENTS

EP         3054104 A2    8/2016
WO       2018050192 A1   3/2018

OTHER PUBLICATIONS

International Search Report and Written Opinion mailed Oct. 12, 2020 for PCT/EP2020/069852 (13 pages).

*Primary Examiner* — Christopher T Schatz
(74) *Attorney, Agent, or Firm* — Sheppard Mullin Richter & Hampton LLP

(57) ABSTRACT

A method of bonding a composite vane to at least one support. The method includes positioning an end of a vane within a support, causing an adhesive to flow between the vane and the support from an inlet to an outlet, and reversing the flow of adhesive from the outlet towards the inlet.

14 Claims, 5 Drawing Sheets

(51) Int. Cl.
 *B29K 63/00* (2006.01)
 *B29L 31/30* (2006.01)
 *F01D 5/30* (2006.01)

(56) References Cited

U.S. PATENT DOCUMENTS

| | | | |
|---|---|---|---|
| 5,035,602 A * | 7/1991 | Johnson | B29C 70/48 |
| | | | 428/137 |
| 5,074,772 A | 12/1991 | Gutjahr | |
| 5,770,131 A | 6/1998 | Bubel et al. | |
| 5,863,452 A * | 1/1999 | Harshberger, Jr. | B29C 33/50 |
| | | | 425/389 |
| 7,998,303 B2 | 8/2011 | Baehmann et al. | |
| 9,073,267 B1 | 7/2015 | Badgley et al. | |
| 2002/0051707 A1 | 5/2002 | Takahashi et al. | |
| 2007/0145622 A1* | 6/2007 | Cicci | B29C 70/443 |
| | | | 264/511 |
| 2009/0115112 A1* | 5/2009 | Liebmann | B29C 70/443 |
| | | | 264/510 |
| 2010/0124654 A1* | 5/2010 | Smith | B29C 43/3642 |
| | | | 425/405.2 |

\* cited by examiner

INJECTION BONDING OF COMPOSITE VANE INTO POCKET

CROSS-REFERENCE TO RELATED APPLICATIONS

This application is a national stage of, and claims priority to, Patent Cooperation Treaty Application No. PCT/EP2020/069852, filed on Jul. 14, 2020, which application claims priority to Great Britain Application No. GB 1910198.9, filed on Jul. 16, 2019, which applications are hereby incorporated herein by reference in their entireties.

BACKGROUND

Existing methods for joining vanes to supports include applying or smearing adhesive onto the vane before it is placed in the cavity of the support. Once the vane is put into the fixture, it is cured to hold it in place. This method is simple and economical and can be performed without expensive equipment or training.

Although existing manufacturing techniques offer the above advantages, it has been found that defects can exist in components formed in this way. Specifically, large voids can be generated in the bond line which are problematic because they reduce the structural integrity of the joint and can lead to failures.

Alternative techniques for forming such components include injection bonding which requires complex and expensive manufacturing equipment. However, conventional injection moulding techniques still cause the formation of voids and discontinuities within the structure. This is often due to air pockets forming in the adhesive flow front. Furthermore, the complex geometries and positioning of the adhesive inlet and outlet sometimes results in areas or volumes around the inlet and outlet being difficult to fill with adhesive. There may also be air or gas in the adhesive when it is injected which further leads to the air pockets being formed.

Furthermore, the adhesive being injected into the joint takes the route of least resistance through the cavity. Therefore, often the adhesive is unevenly distributed in the cavity between the vane and the support. For example, the adhesive may travel on the side of the vane closest to the injection point thus meaning there is an uneven amount of adhesive on each side of the vane. Therefore, the vane is not held evenly on both sides. This can lead to uneven stress distributions in the vane. Therefore, the structural integrity of the joint is still not optimised when using a standard injection bonding method.

SUMMARY

The present disclosure describes an improved method of forming bonded parts. Specifically, the present disclosure describes an approach which provides an improvement over basic bonding techniques and additionally overcomes the deficiencies of conventional injection bonding of a joint between a vane and a support. This method is an unconventional approach to achieving an air tight seal between the vane and the support.

The present disclosure relates in general to a method of injection bonding a composite vane to a pocket or cavity of a support for use in gas turbine engines. However, it will be recognised from the disclosure herein that the inventive concepts are also applicable to injection bonding in different applications other than gas turbine engines, for example, where it is desirable to connect two pieces using injection bonding where it is desirable not to have voids in the bond line.

The disclosure further relates to an apparatus for carrying out the method.

In an implementation, there is provided a method of bonding a composite vane to at least one support. The method includes the steps of: (a) positioning an end of a vane within a support; (b) causing an adhesive to flow between the vane and the support from an inlet to an outlet; and (c) reversing the flow of adhesive from the outlet towards the inlet.

In this way, an air tight seal may be achieved between the vane and the support. This is important in gas turbine engines, for example aircraft engines where high tolerances between parts are required. Voids are often formed in adhesive due to air pockets forming in the flow front or due to the complex geometry of the gap between the vane and the support. The reversal of the flow therefore enables any voids in the adhesive to be filled.

The term "support" is used to refer to a part which may be positioned at the inner or outer diameter of the bypass channel of a gas turbine engine. The support has an internal space which is able to receive an end of the vane and secure the vane in place.

There may be a clearance between the vane and the support which defines a space to receive the adhesive. The space enables the flow of adhesive either side of the vane within the support thus enabling the vane to be securely positioned in the support.

The term "space" is intended to refer to the gap formed around the part of the vane received by the support.

The temperature of the space may be increased before injecting the adhesive. This reduces the viscosity of the adhesive thus improving the flow of the adhesive through the space.

A differential pressure may be created between the inlet and outlet to cause the adhesive to flow into and through the space. The pressure differential aids the movement of the viscous adhesive through the space.

The pressure may be increased at the inlet to a suitable pressure. For example, the pressure may be increased to approximately 2 bar. It has been found that this pressure optimises the flow of the adhesive through the space.

The pressure at the outlet may be reduced before releasing or injecting the adhesive into the inlet. This enables the adhesive to be drawn through the space, thus aiding flow of the viscous adhesive.

The pressure at the outlet may be reduced below atmospheric pressure before releasing or injecting the adhesive into the inlet. The vacuum formed by this reduction in pressure causes the adhesive to be drawn through the space.

The amount of adhesive may be monitored at the outlet. The adhesive may be caused to flow between the vane and the support until a predetermined quantity of adhesive has left the outlet. This ensures that the required amount of adhesive for filling the space has been injected through the inlet.

The predetermined quantity of adhesive in one example may be between approximately $1.3e^{-6}$ m$^3$ and approximately $2.5e^{-6}$ m$^3$.

A valve at the inlet may be closed when the predetermined quantity of adhesive has left the outlet and before the flow of adhesive is reversed.

In this way, when the flow is reversed, resin which has already filled the space in between the vane and the adhesive is not able to flow back into the inlet. Therefore, the reverse flow of adhesive allows any air pockets formed between the vane and the support to be compressed. This therefore enables any complex geometries between the vane and support to be reliably filled with adhesive.

In an implementation, the flow may be reversed from the outlet towards the inlet by increasing the pressure at the outlet. This enables the adhesive which has left the space through the outlet to flow back into the space and fill any voids which remain.

Following the reversing of the flow, the pressure at the inlet and the outlet may be held at about the same pressure. This prevents adhesive which flowed into the space during the initial injection from flowing back out through the inlet.

Following the reversing of the flow, the pressure at the inlet and the outlet may advantageously be maintained at a pressure for a predetermined period of time. For example, the pressure may be maintained at a pressure of between approximately 1 and 3 bar.

The adhesive flow may be caused to fluctuate between a first direction from the inlet to outlet and a second direction from the outlet to the inlet. Using this fluctuation of flow, it can be ensured that adhesive has completely filled the space and no voids remain in the space.

The method may also include positioning an opposing end of the vane within a second support; causing an adhesive to flow between the opposing end of the vane and the second support from an inlet to an outlet; and reversing the flow of adhesive from the outlet towards the inlet.

In another implementation, there is provided an apparatus for carrying out the above method. The apparatus includes: at least one support including an inlet, an outlet, and a cavity; a vane located in the cavity; and a seal surrounding an end of the support, wherein the seal is configured to prevent adhesive leaving an end of the cavity and is configured to cause the adhesive to form a fillet shape.

The term "cavity" is used to refer to a recessed portion within the support which receives the vane.

The fillet shape of the seal improves the aerodynamic nature of the bond. Improved aerodynamics is important when the method is used for bonding a vane and support for use in a gas turbine engine.

The apparatus may additionally include a fixture attached to the support. The fixture may include an inlet hole and an outlet hole for aligning with the inlet and outlet of the support.

The apparatus may additionally include a foam seal in between the fixture and the support. The foam seal may include an inlet hole and an outlet hole for aligning with the inlet hole and outlet hole of the fixture and the inlet and outlet of the support.

The at least one support may be made of any suitable material such as titanium or another suitable alloy.

Viewed from yet another aspect there is provided a method of joining two parts using injection bonding. The method includes injecting adhesive through an inlet into a cavity until a predetermined quantity of adhesive flows through an outlet, and reversing the direction of flow of the adhesive such that at least a portion of the predetermined quantity of adhesive flows back into the cavity.

Viewed from yet a further aspect, there is provided an aero engine component manufactured by the method as described herein.

BRIEF DESCRIPTION OF THE DRAWINGS

The present disclosure will now be described, by way of example only, with reference to the following figures, in which like parts are depicted by like reference numerals.

Figure 1:
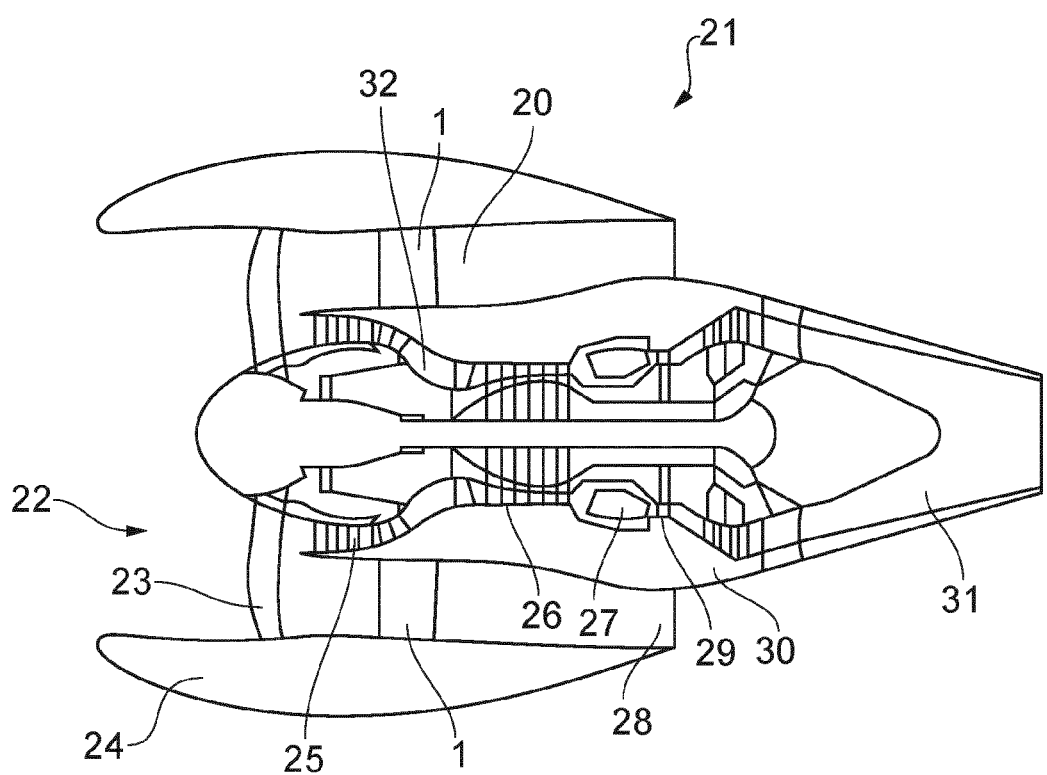
FIG. 1 shows a cross-section of a gas turbine engine incorporating an air flow arrangement according to an invention described herein.

While the present disclosure is susceptible to various modifications and alternative forms, specific embodiments are shown by way of example in the drawings and are herein described in detail. It should be understood, however, that drawings and detailed description are not intended to limit the scope to the particular form disclosed, but on the contrary, the scope is to cover all modifications, equivalents and alternatives falling within the scope defined by the appended claims.

As used in this specification, the words "includes," "including," "comprises," "comprising," and similar words, are not to be interpreted in an exclusive or exhaustive sense. In other words, they are intended to mean "including, but not limited to".

It will be recognised that the features of the inventive concepts described herein can conveniently and interchangeably be used in any suitable combination.

DETAILED DESCRIPTION

The present disclosure relates to a method of bonding a composite vane to a support and an apparatus for performing the method. A composite vane may be used in a gas turbine engine, for example in an aircraft.

FIG. 1 shows a cross-section of a gas turbine engine 21 which may incorporate a vane according to an implementation as described in detail below.

The skilled person will understand the principal components of a gas turbine engine and their operation. In summary, the engine 21 includes an air intake 22 which permits air to flow into the engine to the fan 23 located at the upstream end of the engine. All of the components are housed within the engine nacelle 24.

The engine includes a bypass channel 20 downstream of the fan and a central engine core which contains the compressors, combustors, and turbines. The core of the engine is formed of a first low pressure compressor (LPC) 25 and a second high pressure compressor (HPC) 26. This multistage compressor arrangement takes air from ambient pressure and temperature to high temperature and pressure. Compressed air is then communicated to the combustion chamber 27, where fuel is injected and combustion occurs.

The combustion gases are expelled from the rear of the combustions chamber 27 and impinge first on a high pressure turbine 29 and then on a second low pressure turbine 30 before leaving the rear of the engine through the core nozzle 31. Thrust from the engine is created by two gas flows: a first from the fan nozzle 28 (receiving thrust from the fan) and, secondly, from the exhaust gases from the core nozzle 31.

The vanes 1 according to the present disclosure may, for example, be formed of composite materials such as carbon fibre in an epoxy matrix. The term composite is intended to refer to a carbon (or other) reinforced plastic.

The support is configured to connect the vane to the core of the engine and the inside surface of the bypass channel 20 with the vane extending across the bypass channel. The supports are connected to the vane at either end.

Figure 2:
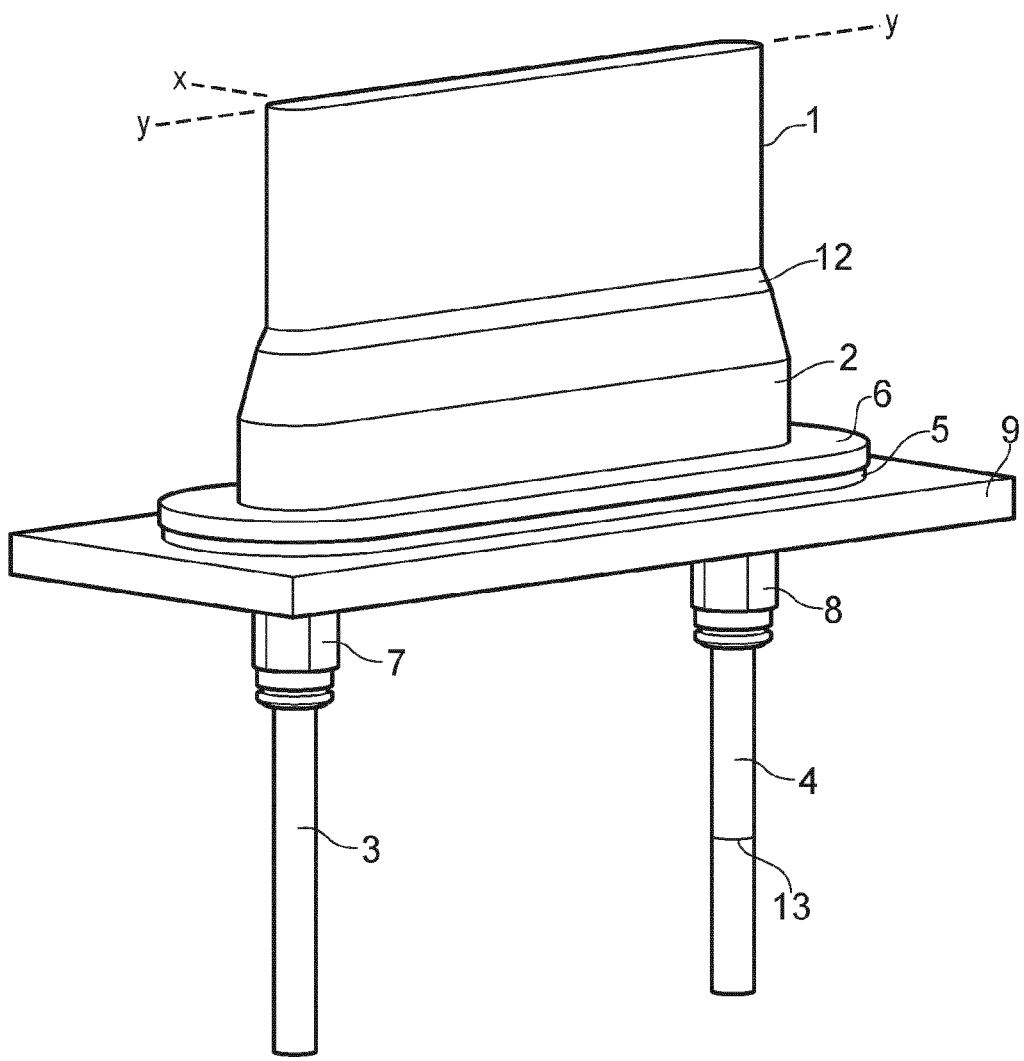
FIG. 2 shows an isometric view of a vane fixed to a support and attached to a fixture according to the invention.

FIG. 2 shows an isometric view of the apparatus according to the present disclosure for bonding a composite vane 1 to a support 2. In the present example, the support 2 is made of titanium. In other examples, the support 2 may be made of an aluminium alloy with galvanic protection or a short fibre composite or of a different material. The support 2 has a cavity for receiving the vane.

The support 2 may have a base plate 6. When the composite vane and support are in use, the base plate 6 of the support 2 is configured to be attached to an aircraft engine. When the vane 1 is being bonded to the support 2, the base plate 6 is attached to a fixture 9 via a seal 5 (such as an elastomer or foam). The fixture 9 is adapted to conform to the profile of the outer surfaces of the base plate. The seal 5 is positioned between the fixture and the base plate.

Each of the fixture 9 and the foam seal 5 are formed with two holes, an inlet hole and an outlet hole. In the example shown, a single inlet and single outlet is used. Multiple inlets and outlets may also be used.

An inlet tube 3 is held in position by an inlet connecting piece 7, allowing fluid communication of adhesive through the connection, as described below. The inlet tube 3 is connected to an adhesive source.

An outlet tube 4 is held in position by an outlet connecting piece 8. The inlet connecting piece 7 and the outlet connecting piece 8 are connected to the fixture 9.

The foam seal 5 is replaced after each use whereas the fixture 9, inlet tube 3, outlet tube 4, inlet connecting piece 7, and outlet connecting piece 8 may be reused for another vane.

The inlet tube 3 is connected to a source of adhesive. In the present example, the inlet tube 3 is also connected to a pressure control device and the outlet tube 4 is connected to a vacuum pump. A valve is included on each of the inlet and outlet tubes to switch between use of the pressure control device and the vacuum pump. The outlet tube 4 of the present invention has an indicator line 13 which indicates when a desired amount of adhesive has flowed into the outlet tube 4. The outlet tube 4 is transparent such that it is possible for the user to see when the adhesive has reached the indicator line 13. In other examples, the outlet tube may not be transparent and instead a sensor may be used in order to indicate when the desired amount of adhesive has reached the desired volume in the outlet tube 4. For example, a proximity sensor may be used.

FIG. 2 shows the adhesive 10 having been formed into a fillet shape 12.

Figure 3:
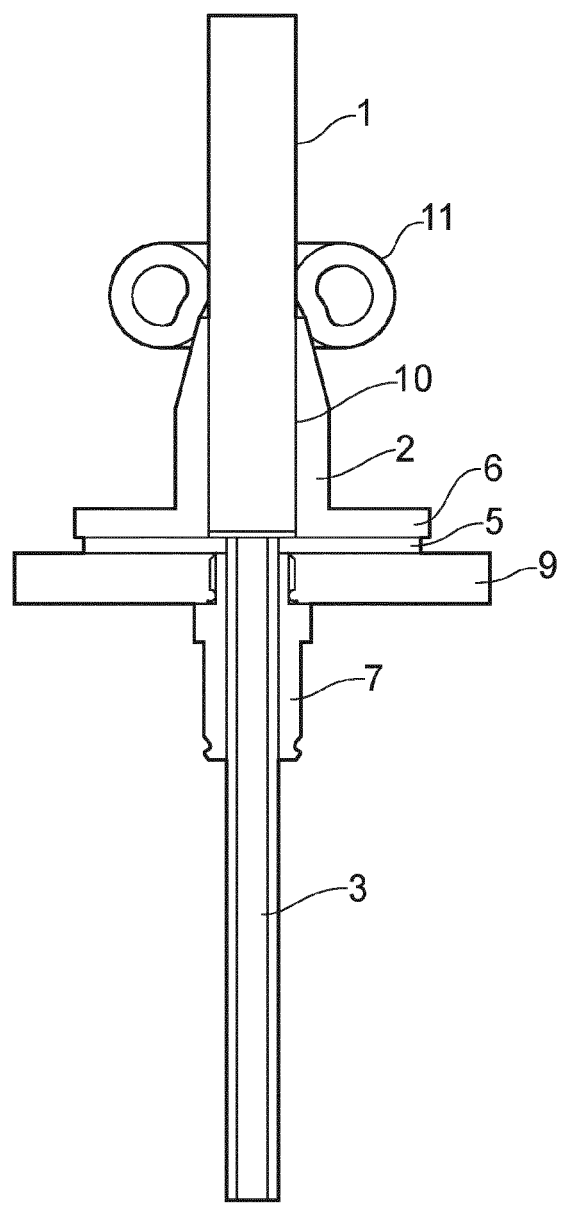
FIG. 3 shows a cross-sectional view in the direction of X-X of the apparatus of FIG. 2.

FIG. 3 shows a cross sectional view of the apparatus of FIG. 2 from the direction X-X shown in FIG. 2. Also shown on this view is a seal 11. The seal 11 is positioned surrounding the vane 1 when the vane 1 has been inserted into the support before injection of the adhesive. The seal 11 prevents the leakage of adhesive and, due to its curved shape, allows the formation of the adhesive into a fillet or radius shape 12. In the present example, the seal is made of silicone and is formed by casting. In other examples, the seal may be made of other materials.

The seal can be adapted so as to create the desired shape of radius or fillet between the support and the vane. This may be a continuous profile along the vane or may be adapted to have a changing profile along the interface between the vane and the support.

Figure 4:
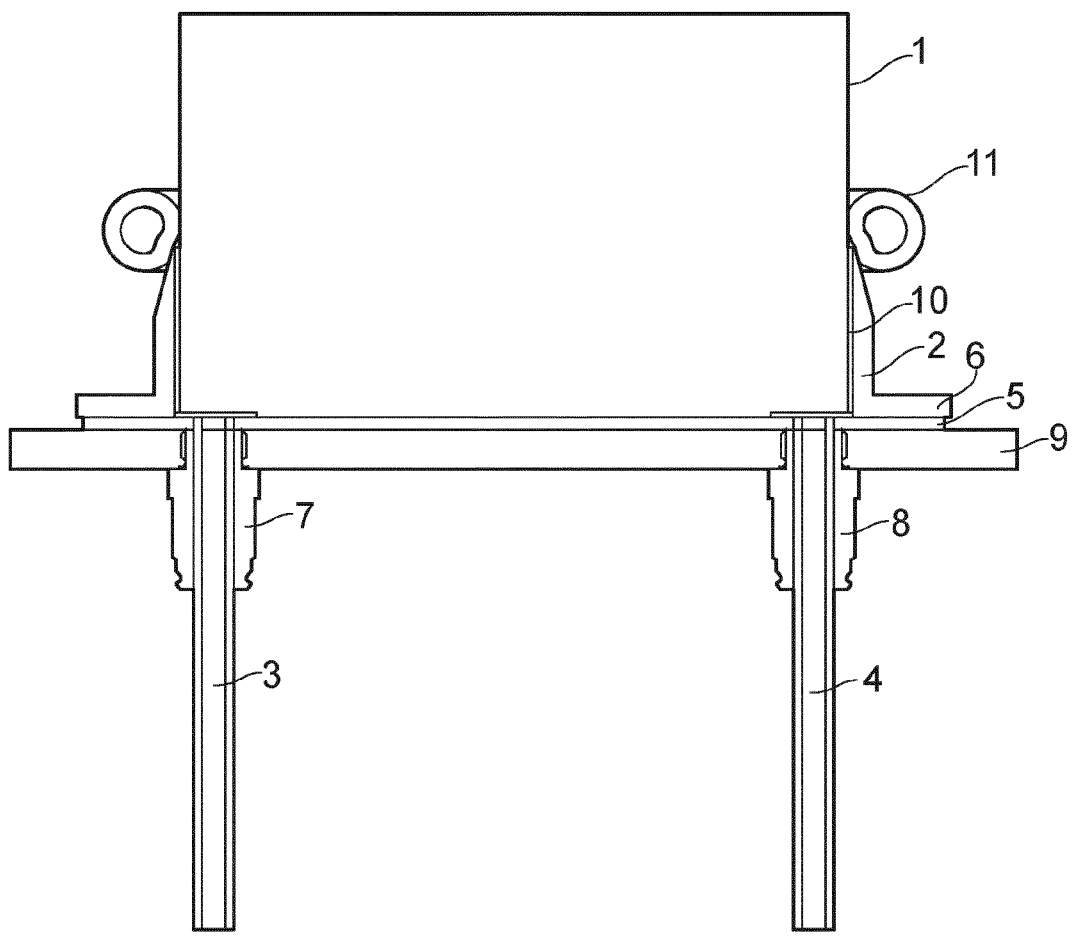
FIG. 4 shows a cross-sectional view in the direction of Y-Y of the apparatus of FIG. 2.

FIG. 4 shows a cross sectional view of the apparatus of FIG. 2 from the direction Y-Y shown in FIG. 2. This shows the inlet hole and the outlet hole in each of the foam seal 5 and the fixture 9.

A method of using the apparatus will now be discussed.

An end of the vane 1 is inserted into the cavity in the support 2. The vane may have geometrical features (not shown) formed on its surface in order to centre the vane inside the cavity. These geometrical features may be elongate protrusions which are extruded from the surface of the vane and which extend in a longitudinal direction of the vane. The geometrical features may also be designed so as to position the vane off-centre in the cavity.

The vane 1 and support 2 are assembled with the foam seal 5 and fixture 9 and the inlet tube 3 and outlet tube are inserted in respective holes in the foam seal and fixture. The inlet connecting piece 7 and outlet connecting piece 8 are connected to the fixture 9.

The other end of the vane may also simultaneously be inserted into a cavity of a separate support. Alternatively, the other end of the vane may be fixed to the separate support following the connection of the first end to the support 2.

The seal 11 is positioned at an end of the cavity into which the vane has been inserted. In one example, the seal is held in place by a clamp located on the fixture. The clamp may be made of metal. Next, the sealing of the connections is checked using a vacuum check.

Once it is determined that the system is airtight, the fixtures and parts are heated up leading to an increase in temperature of the cavity. For example, the parts may be heated up to a temperature of between 60° C. and 80° C. In other examples, the parts may be heated to another temperature outside this range which is above room temperature. The temperature to which the parts are heated depends on the adhesive to be used.

In the present example, the temperature of the fixtures and parts is increased using a convection oven. This reduces the viscosity of the adhesive as it enters the cavity thus optimising flow. The adhesive may also be heated before it is caused to flow into the cavity in order to reduce its viscosity.

Adhesive is caused to flow into the cavity through the inlet tube 3. This is done by applying a vacuum at the outlet before increasing the pressure in the inlet tube 3. The pressure in the inlet tube may be set to between 0.5 and 2.5 bar. In the present example, the pressure in the inlet tube is set at 2 bar. In other examples, a different pressure may be used. For example, the pressure could be set to 1 bar.

The adhesive fills the cavity between the vane 1 and the support 2 and exits through the outlet tube 4 due to the vacuum. The adhesive is caused to flow until the desired amount has left the cavity through the outlet tube. This indication is provided either by the adhesive reaching the indicator line 13 (shown in FIG. 2) or by the adhesive being sensed by a sensor, see above. In the present example, the adhesive is caused to flow into the cavity until $1.3e^{-6}$ m$^3$ has left the cavity. In other examples, the desired amount may be more or less than this. For example, the desired amount could be between about $1.3e^{-6}$ and $2.5e^{-6}$ m$^3$.

When the desired amount has left the cavity into the outlet tube 4, flow of the adhesive is stopped and the connection to the adhesive source from the inlet tube 3 closed off. This is done by closing the valve in the inlet tube.

As the adhesive propagates across the interface between the vane and the inner surfaces of the support, irregular surface tension and imperfections in the surfaces can cause pockets or voids in the adhesive to form. These are detrimental to the strength of the connection between the support and the vane and are also detrimental to the structural strength and integrity of the joint.

To prevent such discontinuities a reverse flow of adhesive is then performed as described below.

The pressure is increased in the outlet tube 4 by the pressure control device. In the present example the pressure at the outlet is increased from vacuum to 2 bar. In other examples, the pressure may be increased to a value higher or lower than this. The pressure at the inlet may also be maintained at 2 bar or, if another pressure is used at the outlet, to a pressure substantially equal to that at the outlet. The adhesive is then forced back into the cavity due to the increased pressure in the outlet tube. This causes any voids in the cavity between the vane and the support to be filled. The pressure is maintained at a constant value for a predetermined period of time. This predetermined period of time is determined based on the type of adhesive being used and the size of the cavity amongst other factors.

In the present example, the temperature is also maintained at a constant value.

Once this has been carried out, the apparatus is cured. Following curing, the foam seal 5 and fixture 9 are removed from the vane 1 and the support 2.

Figure 5:
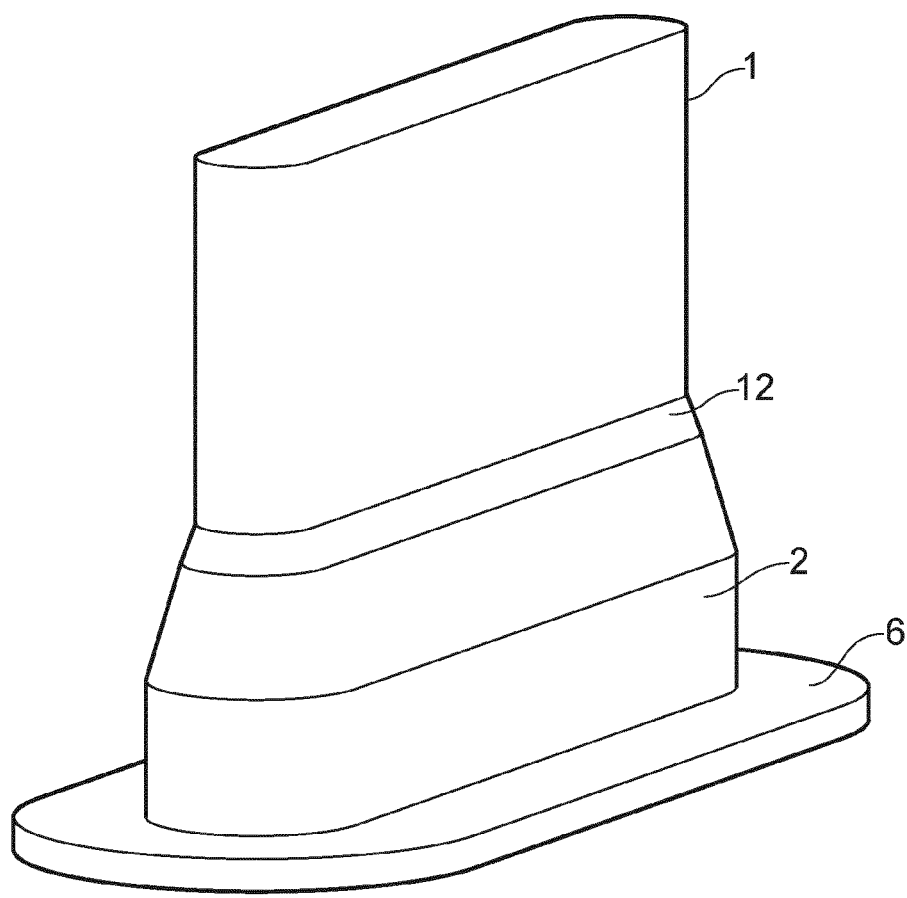
FIG. 5 shows the vane fixed to the support following removal from the fixture.

FIG. 5 shows the vane 1 attached to the support 2 following removal from the foam seal 5 and fixture 9.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the inventive concepts as defined by the claims or limitations on equivalents to the claims, and that other embodiments may be utilised and modifications may be made without departing from the scope of the claims. Various implementations may suitably comprise, consist of, or consist essentially of, appropriate combinations of the disclosed elements, components, features, parts, steps, means, etc, other than those specifically described herein. In addition, this disclosure may include other inventive concepts not presently claimed, but which may be claimed in future.

The invention claimed is:

1. A method comprising:
    positioning an end of a vane within a support, the positioning establishing a clearance region between the vane and the support to receive adhesive, the positioning forming a gap along at least a portion of a perimeter between the vane and the support;
    positioning an inlet at a first position of the clearance region between the vane and the support;
    positioning an outlet at a second position of the clearance region between the vane and the support;
    positioning a seal around at least a portion of the vane and the support adjacent the gap, the seal having a contour facing the gap;
    causing the adhesive to flow in the clearance region between the vane and the support from the inlet to the outlet;
    reversing the flow of the adhesive from the outlet towards the inlet; and
    after reversing the flow, holding inlet pressure at the inlet and outlet pressure at the outlet at about a same pressure level,
    wherein the adhesive joins the vane and the support together into a single part and the adhesive forms a fillet along the gap due to the contour of the seal.

2. The method of claim 1, further comprising increasing a temperature of the clearance region before causing the adhesive to flow between the vane and the support.

3. The method of claim 1, wherein causing the adhesive to flow in the clearance region between the vane and the support from the inlet to the outlet includes creating different pressures at the inlet and the outlet to cause the adhesive to flow into and through the clearance region.

4. The method of claim 3, further comprising increasing the inlet pressure at the inlet to approximately 2 bar.

5. The method of claim 3, further comprising reducing the outlet pressure at the outlet before releasing or injecting the adhesive into the inlet.

6. The method of claim 5, further comprising reducing the outlet pressure at the outlet below atmospheric pressure before releasing or injecting the adhesive into the inlet.

7. The method of claim 1, further comprising monitoring the amount of adhesive at the outlet, and causing the adhesive to flow in the clearance region between the vane and the support until a predetermined quantity of the adhesive has left the outlet.

8. The method of claim 7, wherein the predetermined quantity of adhesive is between approximately $1.3e^{-6}$ m$^3$ and approximately $2.5e^{-6}$ m$^3$.

9. The method of claim 7, further comprising closing a valve at the inlet when the predetermined quantity of the adhesive has left the outlet and before the reversing the flow of the adhesive.

10. The method of claim 1, wherein the reversing the flow of the adhesive from the outlet towards the inlet includes increasing the outlet pressure at the outlet.

11. The method of claim 1, wherein the holding the inlet pressure at the inlet and the outlet pressure at the outlet at about the same pressure level includes holding the inlet pressure at the inlet and the outlet pressure at the outlet at about a pressure level of between approximately 1 and 3 bar for a predetermined period of time.

12. The method of claim 1, further comprising causing the adhesive flow to fluctuate between a first direction from the inlet to outlet and a second direction from the outlet to the inlet.

13. The method of claim 1, further comprising
    positioning an opposing end of the vane within a second support;
    causing a second adhesive to flow in a second clearance region between the opposing end of the vane and the second support from a second inlet to a second outlet; and
    reversing the flow of the second adhesive from the second outlet towards the second inlet.

14. The method of claim 1, further comprising, before positioning the end of the vane within the support and before causing the adhesive to flow in the clearance region between the vane and the support, providing the support and providing the vane separate from the support.

* * * * *